(No Model.)
W. L. LAFFER.
FORK.
No. 512,721. Patented Jan. 16, 1894.
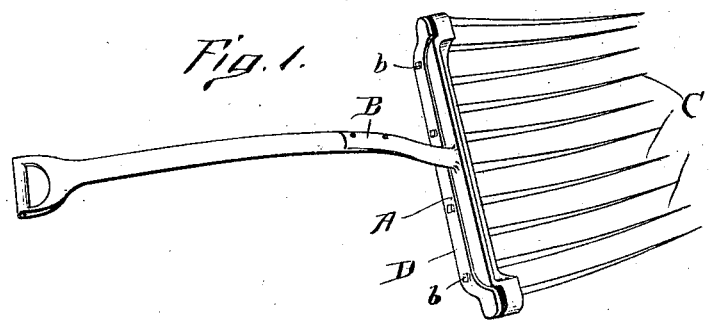
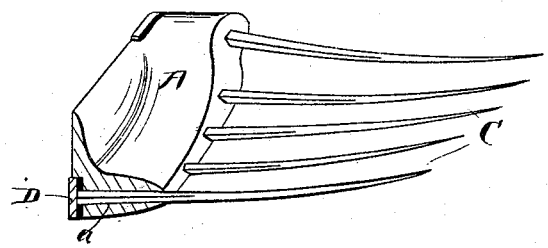
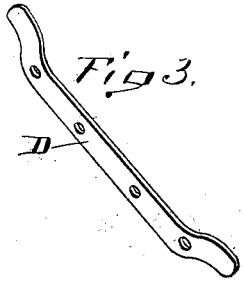
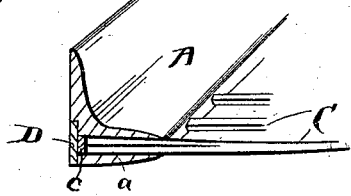
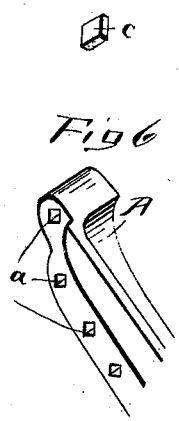
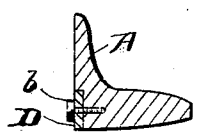
WITNESSES:
S. J. Cross,
Laura Shaffer.
INVENTOR
Walter L. Laffer
By Fred W Bond
Attorney
THE NATIONAL LITHOGRAPHING COMPANY,
WASHINGTON, D. C.

UNITED STATES PATENT OFFICE.

WALTER L. LAFFER, OF CLEVELAND, OHIO.

FORK.

SPECIFICATION forming part of Letters Patent No. 512,721, dated January 16, 1894.

Application filed February 20, 1893. Serial No. 462,993. (No model.)

*To all whom it may concern:*

Be it known that I, WALTER L. LAFFER, a citizen of the United States, residing at Cleveland, in the county of Cuyahoga and State of Ohio, have invented certain new and useful Improvements in Forks; and I do hereby declare that the following is a full, clear, and exact description of the same, reference being had to the annexed drawings, making a part of this specification, and to the letters of reference marked thereon, in which—

Figure 1, is a perspective view of the fork. Fig. 2 is a transverse section of the fork-head showing the filling-blocks removed, and the tines properly attached. Fig. 3 is a detached view of the back-plate. Fig. 4 is a transverse section of the head, showing the filling block properly adjusted and illustrating the tines attached. Fig. 5 is a transverse section of the head showing section of back plate. Fig. 6 is a view showing a portion of the head with the back-plate removed. Fig. 7 is a detached view of the filling block.

The present invention has relation to forks, and it consists in the different parts and combination of parts hereinafter described and particularly pointed out in the claim.

Similar letters of reference indicate corresponding parts in all the figures of the drawings.

In the accompanying drawings A represents the head which is substantially of the form shown in the drawings, and as shown it is provided with the tine apertures $a$. For the purpose of elevating the end tines of the fork slightly above the center tines, the ends of the head A are bent or curved upward, substantially as illustrated in Fig. 1. To the head A, is attached the handle socket B, which handle socket is preferably formed integral with the head A.

The tines C, are substantially of the form shown in the drawings, and are placed through the apertures $a$, and are so adjusted as to size, that when placed within the apertures $a$, their ends will extend a short distance beyond the back of the head. After the tines C, have been properly adjusted to the head A, the back plate D is placed in the position illustrated in Fig. 1 and securely held in said position by means of the lug bolts or screws $b$, or their equivalents. It will be understood that by adjusting the tines C, so that they will extend a short distance back of the rear portion of the head A, the plate D, will rest or press against the rear ends of the tines, thereby preventing said tines from becoming disengaged from the head from use. It will be understood that the tines are to be made somewhat larger in diameter than the diameter of the apertures $a$; and for the purpose of securely attaching the tines to the head the apertures $a$, and the tines should be formed tapering.

As the tines become loosened in the head A, from use, the lug bolts or screws are turned so as to draw the back plate D, toward the head, thereby tightening said tines, it being understood that originally the back plate is to set a short distance from the back edge of the head A, as illustrated in Fig. 2. If the ends of the tines should pass the rear edge of the head, the filling blocks $c$ are placed in the apertures $a$, over the ends of the tines thereby providing a means for pressing or crowding the tines forward, and securely holding said tines to the head.

In the drawings the back bar D, is shown formed in a single piece, but it will be understood that the back bar may be formed in sections, and the sections attached to the head, and the same object be accomplished; but I prefer to form the back bar of a single piece as illustrated. It will be understood that by my peculiar arrangement no rivets of any kind are employed in holding the tines to the head.

The back plate D is adjustably attached to the head, and is so attached for the purpose of changing its position during the different stages of wear, thereby providing a means for setting said plate so as to tighten the tines. It will be understood that by providing the filling blocks the tines can be forced forward to a point so as to bring their rear ends past and beyond the rear edge of the head. The plate D also acts as a stop against backward pressure of the tines, but forms no part of the head, except to resist the longitudinal movement of the tines.

Having fully described my invention, what I claim as new, and desire to secure by Letters Patent, is—

As an improved article of manufacture the combination of the head A provided with tine apertures and the handle socket, the tines fixed to the head A, the adjustable plate D located at the rear of the head A, and below the handle socket $b$, and the filling blocks $c$, all arranged substantially as and for the purpose set forth.

In testimony that I claim the above I have hereunto subscribed my name in the presence of two witnesses.

WALTER L. LAFFER.

Witnesses:
W. L. LAFFER,
G. J. BAILEY.